United States Patent [19]
Krohn et al.

[11] 4,191,020
[45] Mar. 4, 1980

[54] SERVO BRAKE SYSTEM

[75] Inventors: Hellmut Krohn, Esslingen; Werner Kruse, Schorndorf-Schornbach; Reinhard Resch, Stuttgart, all of Fed. Rep. of Germany

[73] Assignee: Daimler-Benz Aktiengesellschaft, Fed. Rep. of Germany

[21] Appl. No.: 813,431

[22] Filed: Jul. 7, 1977

[30] Foreign Application Priority Data

Jul. 14, 1976 [DE] Fed. Rep. of Germany ....... 2631604

[51] Int. Cl.² .............................................. B60T 13/20
[52] U.S. Cl. ...................................... 60/550; 60/562; 60/577; 60/588
[58] Field of Search ................. 60/547, 548, 550, 552, 60/553, 554, 562, 574, 589, 588, 593, 576, 577, 592, 551, 582

[56] References Cited

U.S. PATENT DOCUMENTS

| | | | |
|---|---|---|---|
| 2,458,803 | 1/1949 | Stelzer | 60/551 |
| 3,162,018 | 12/1964 | Daley, Jr. | 60/562 |
| 3,473,329 | 10/1969 | Eggstein | 60/562 |
| 3,855,797 | 12/1974 | Papiau | 60/582 |
| 3,886,746 | 6/1975 | Farr | 60/547 |
| 3,922,858 | 12/1975 | Sadler | 60/562 |
| 4,050,251 | 9/1977 | Carre | 60/574 |
| 4,072,014 | 2/1978 | Gardner | 60/562 |

FOREIGN PATENT DOCUMENTS 819786 11/1951 Fed. Rep. of Germany ............ 60/589

*Primary Examiner*—Abraham Hershkovitz
*Attorney, Agent, or Firm*—Craig and Antonelli

[57] ABSTRACT

A servo brake system with at least two circuits, equipped with a tandem master cylinder, in which two working pistons are arranged coaxially one behind the other; a transmission shifting device thereby automatically shifts in case of failure of the servo installation to a larger pedal travel with a mechanically applied brake pressure that is reduced within permissive limits; the working piston of the actuating side thereby includes a bore coaxial to the other working piston, in which a plunger piston is guided which is actuatable by the input piston.

5 Claims, 1 Drawing Figure

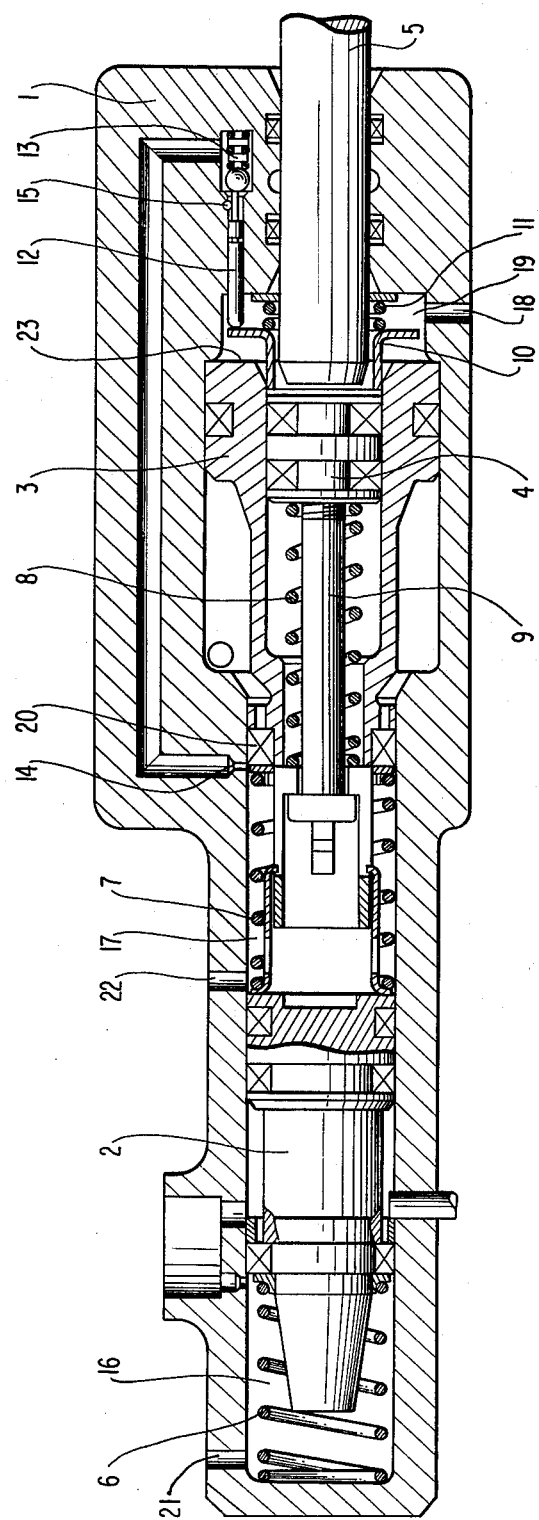

SERVO BRAKE SYSTEM

The present invention relates to an at least two-circuit servo brake installation with a tandem master cylinder, in which two working pistons are arranged coaxially one behind the other, of which the working piston on the actuating side may be a differential or stepped piston and which has a transmission ratio shifting device, which in case of failure of the servo installation automatically shifts over to a larger pedal path or travel with a mechanically applied brake pressure that is produced within permissive limits.

Heavy vehicles require, as a rule, a servo-assist for a safe and comfortable actuation of the brake. An installation required therefor includes a pump, which puts a brake medium under pressure that is fed to the brake installation possibly by way of a connecting valve. According to official regulation, a certain minimum braking must be assured with predetermined pedal forces in case of a failure of the servo installation. This requirement is fulfilled with the aid of the brake mechanism according to the present invention, which with a given work that the driver is able to apply at the brake pedal, reduces the factor pedal force and increases the factor pedal travel within permissive limits.

Installations are known in the prior art which, in case of a failure of the servo system, exhibit a translation or transmission ratio change of the described type. These prior art installations, however, operate for the most part with expensive piston locking or blocking mechanisms controlled by the servo pressure or with a working piston directly mechanically actuatable in case of failure of the servo installation.

A direct working piston actuation, however, requires large piston strokes by reason of piston reaction surfaces which are to be kept small, and therewith a large axial structural length, whence the applicability and usability is limited by reason of space difficulties during the installation.

It is the aim of the present invention to undertake measures with a servo-assisted hydraulic brake installation, which in case of failure of the servo-assist produce a favorable translation or transmission ratio. Additionally, the subject matter of the present invention is to be so constructed that it does not entail the described disadvantages.

The underlying problems are solved according to the present invention in that the working piston on the actuating side of the two working pistons which are hydraulically operatively connected with each other, includes a coaxial bore, in which a plunger piston is guided, which is actuatable by the input piston (hydraulically or mechanically).

According to a further feature of the present invention, an equalization bore may be provided in the cylinder housing, which connects the pressure space acted upon by the working piston on the actuating side with a pressure medium reservoir and with the equilization bore being adapted to be closed off in case of failure of the servo installation.

The equalization bore may be in communication with a supply reservoir or tank with a non-actuated brake. Additionally, the plunger piston which is guided in the working piston on the actuating side, may be tied to this working piston by means of a spring and cap screw. As a result of this measure, a movement of the plunger piston opposite the actuation direction is prevented if, by reason of the differing area ratios of the working piston end faces, different pressures act on the two end surfaces, and if the booster or servo dimensioning was so realized that after actuation and with an intact booster or servo installation, a transmission ratio results between the working piston travel and the input piston travel which is larger than or equal to one, whence the plunger piston cannot support itself at the input piston.

Accordingly, it is an object of the present invention to provide a servo brake system which avoids by simple means the aforementioned shortcomings and drawbacks encountered in the prior art.

Another object of the present invention resides in a servo brake installation which fully satisfies all official regulations in case of failure of the servo-assist.

A still further object of the present invention resides in a servo brake system which is characterized by a relatively short axial structural length, thereby facilitating its installation within the limited space conditions of a motor vehicle.

Another object of the present invention resides in a servo brake installation of the type described above which produces a favorable translation ratio in case of failure of the servo-assist.

These and other objects, features and advantages of the present invention will become more apparent from the following description when taken in connection with the accompanying drawing which shows, for purposes of illustration only, one embodiment in accordance with the present invention, and wherein:

The single FIGURE is a somewhat schematic axial cross-sectional view through one embodiment of a servo brake mechanism in accordance with the present invention.

Referring now to the single FIGURE of the drawing, reference numeral 1 designates in the illustrated longitudinal cross section of the master brake cylinder a housing which accommodates two working pistons 2 and 3, a plunger piston 4 and an input piston 5. The working pistons 2 and 3 as also the plunger piston 4 are spring-loaded by means of piston return springs 6, 7 and 8, respectively. A tie-bolt 9 is secured to the plunger piston 4. Reference numeral 10 designates a valve-actuating sleeve, reference numeral 11 a spring for the latter, reference numeral 12 a valve plunger and reference numeral 13 a closure valve.

An equalization bore 14 is provided in the housing 1, which is in communication with a reservoir tank (not shown) by way of the valve 13 adapted to be closed and by way of a bore 15. The pressure spaces 16 and 17 are partitioned off or subdivided by the working pistons 2 and 3. A bore 18 connects a pressure space 19 with a pressure medium source (not shown) by way of a connecting valve (not shown). The working piston 3 constructed as stepped or differential piston carries on the side of its smaller diameter a seal 20 which cooperates with the equalization bore 14.

The servo brake installation operates with an intact servo or booster installation as follows.

Upon actuation of the input piston 5, a connecting valve (not shown) of conventional construction which cooperates with a pressure medium source, is controlled. As a result thereof, this connecting valve is opened in a conventional manner. Pressure medium then flows by way of the bore 18 into the pressure space 19, as a result of which, the working piston 3 on the actuating side and the plunger piston 4 are displaced in the direction toward the working pressure spaces 16 and 17, which are in communication by way of the bores 21 and 22 with the brake cylinders at the front and rear wheels.

As a result of the further movements, the lip seal 20 travels over or valves the equalization bore 14, whereupon a hydraulic pressure builds up in the pressure spaces 16 and 17, as a result of which the wheel brakes are pressure-actuated in a known manner. At the same time, a reaction force acts on the input piston 5 which is transmitted onto the brake pedal. If the booster or servo dimensioning is so chosen and realized that a transmission or translation larger or equal to one results between the travel of the working piston 3 and the travel of the input piston 5, then the plunger piston 4 cannot support itself at the input piston 5 during the actuation. In order to prevent a movement of the plunger piston 4 opposite the actuating direction, the plunger piston 4 is so tied or connected to the working piston 3 with the aid of the return spring 7, spring retainer 7′, and threaded portion of the bolt or screw 9 that it is displaceable only in the actuation direction.

In case of failure of the servo installation and in case of a brake actuation, the input piston 5 together with the plunger piston 4 are displaced in the direction toward the pressure spaces 16 and 17. The working piston 3 thereby remains in its starting position because the otherwise customary pressure of the pressure medium source of the servo installation is absent on its end face 23. As a result of the plunger piston movement, the valve sleeve 10 may now be displaced by the spring 11 and the valve plunger 12 may now be displaced by the valve spring of the valve 13 so that the valve 13 is closed. The connection of the pressure space 17 with the reservoir tank by way of the bore 15 is therewith interrupted. During a further piston movement, a hydraulic pressure can build up in the pressure spaces 16 and 17, as a result of which the wheel brakes are again pressure-actuated in the customary manner. For the same pressures in the wheel brake cylinders, one only needs a longer travel of the input piston 5 and a larger pressure on the same because the servo-assist is now missing. However, both can be kept within acceptable limits as required by the regulations with a matched dimensioning of the piston cross sections.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An at least two-circuit servo brake installation, the installation including a tandem master cylinder means including housing means, two working piston means arranged substantially coaxially behind one another in the housing means, an input piston means, a servo means operatively connected to the master cylinder means, and a transmission shifting means for automatically shifting to a larger pedal travel with a mechanically applied brake pressure reduced within permissive limits upon a failure of the servo means, characterized in that the two working piston means are hydraulically operatively connected to each other, a first of the working piston means is disposed on an actuating side of the master cylinder means and is provided with an end face adapted to be acted upon by a pressure medium supplied to a first pressure space means, said first working piston means is provided with a bore extending substantially coaxially to the other working piston means, a plunger piston means is guided within said bore and is actuatable by the input piston means, a second pressure space means is provided in the housing means for accommodating a pressure medium, the second pressure space means is disposed so as to be acted upon by the first working piston means, an equalization bore means is provided in the housing means for operatively connecting the second pressure space means with a pressure medium reservoir, said equalization bore means being open during both an unactuated condition of the brake installation and a mechanical actuation of the brake installation upon a failure of the servo means, said first working piston means being cooperable with a first end of said equalization bore means so as to close the same during a servo assisted actuation of the brake installation, means are provided for closing a second end of said equalization bore means with an actuation of the brake installation upon a failure of the servo means including a valve closure member, and means for positioning said valve closure member so as to open or close the second end of the equalization bore means in response to a predetermined condition of the brake installation, said positioning means including a spring means acting upon the valve closure member, a sleeve means operatively connected to the plunger piston means so as to be displaceable therewith, and a displaceably mounted plunger arranged in the first pressure space means and cooperable with said sleeve means so as to maintain the valve closure member in an open position in an unactuated condition of the brake installation and in a closed position in an actuated condition of the brake installation, and in that means are provided for connecting the plunger piston means to said first working piston means.

2. A servo brake installation according to claim 1, characterized in that said first working piston means is a differential piston.

3. A servo installation according to claim 1, characterized in that means are provided for normally biasing said closing means for said equalization bore means into an open position so as to maintain communication between the equalization bore means and a pressure medium with a non-actuated brake installation.

4. A servo brake installation according to claim 1, characterized in that said connecting means includes a threaded means and a spring means.

5. A servo brake installation according to claim 4, characterized in that said first working piston means is a differential piston.

* * * * *